(12) United States Patent
Takada et al.

(10) Patent No.: US 9,740,541 B2
(45) Date of Patent: Aug. 22, 2017

(54) INFORMATION PROCESSING APPARATUS AND METHOD OF COLLECTING PERFORMANCE ANALYSIS DATA

(71) Applicant: FUJITSU LIMITED, Kawasaki-shi, Kanagawa (JP)

(72) Inventors: Shuji Takada, Kawasaki (JP); Takatoshi Fukuda, Sagamihara (JP); Kenjiro Mori, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 14/674,953

(22) Filed: Mar. 31, 2015

(65) Prior Publication Data

US 2015/0205648 A1 Jul. 23, 2015

Related U.S. Application Data

(63) Continuation of application No. PCT/JP2012/075415, filed on Oct. 1, 2012.

(51) Int. Cl.
*G06F 9/30* (2006.01)
*G06F 9/54* (2006.01)
*G06F 11/34* (2006.01)

(52) U.S. Cl.
CPC .......... *G06F 9/546* (2013.01); *G06F 9/30145* (2013.01); *G06F 11/348* (2013.01);
(Continued)

(58) Field of Classification Search
CPC ............. G06F 11/3409; G06F 11/3466; G06F 9/30145; G06F 9/546; G06F 11/348
See application file for complete search history.

(56) References Cited

U.S. PATENT DOCUMENTS 5,796,939 A 8/1998 Berc et al.
6,341,357 B1 * 1/2002 Ravichandran ..... G06F 11/3466
714/38.1
(Continued)

FOREIGN PATENT DOCUMENTS

JP 2-236646 9/1990
JP 4-153742 5/1992
(Continued)

OTHER PUBLICATIONS

International Search Report mailed on Dec. 25, 2012 in corresponding International Patent Application No. PCT/JP2012/075415.
(Continued)

*Primary Examiner* — Benjamin Geib
(74) *Attorney, Agent, or Firm* — Staas & Halsey LLP (57) ABSTRACT

An information processing apparatus includes a packet preprocessing unit configured to generate a packet process request when a packet is received; a CPU core configured to process the packet in response to the packet process request; a hardware element configured to generate a message including information identifying a predetermined event, in response to the predetermined event occurring in accordance with the processing of the packet, the hardware element being provided in the CPU core; and a message recording unit configured to record the message generated by the hardware element together with a count value of a timer.

14 Claims, 9 Drawing Sheets

(52) U.S. Cl.
CPC ...... *G06F 11/3409* (2013.01); *G06F 2201/86* (2013.01); *G06F 2201/88* (2013.01)

(56) References Cited

U.S. PATENT DOCUMENTS

| | | | |
|---|---|---|---|
| 6,523,136 | B1 | 2/2003 | Higashida |
| 7,574,587 | B2 * | 8/2009 | DeWitt, Jr. ......... G06F 9/30181 700/78 |
| 2002/0116562 | A1 | 8/2002 | Mathuna et al. |
| 2006/0056406 | A1 * | 3/2006 | Bouchard ............... H04L 12/56 370/389 |

FOREIGN PATENT DOCUMENTS

| | | |
|---|---|---|
| JP | 10-40224 | 2/1998 |
| JP | 10-260869 | 9/1998 |
| JP | 2000-332205 | 11/2000 |
| JP | 2002-229814 | 8/2002 |
| JP | 2004-519769 | 7/2004 |
| JP | 2006-209251 | 8/2006 |
| JP | 2006-277279 | 10/2006 |
| JP | 2008-512780 | 4/2008 |
| JP | 2010-128681 | 6/2010 |
| WO | WO 02/067123 A1 | 8/2002 |

OTHER PUBLICATIONS

Written Opinion of the International Searching Authority of International Patent Application No. PCT/JP2012/075415 mailed on Dec. 25, 2012.
Patent Abstracts of Japan, Publication No. 2006-277279, published Oct. 12, 2006.
Patent Abstracts of Japan, Publication No. 2-236646, published Sep. 19, 1990.
Patent Abstracts of Japan, Publication No. 10-40224, published Feb. 13, 1998.
Patent Abstracts of Japan, Publication No. 10-260869, published Sep. 29, 1998.
International Patent Publication Bibliographic data, Publication No. WO 2006/031462 A1, published Mar. 23, 2006, corresponding to AC and AK.
Patent Abstracts of Japan, Publication No. 2010-128681, published Jun. 10, 2010.
Patent Abstracts of Japan, Publication No. 2000-332205, published Nov. 30, 2000.
Patent Abstracts of Japan, Publication No. 2006-209251, published Aug. 10, 2006.
Patent Abstracts of Japan, Publication No. 2002-229814, published Aug. 16, 2002.
Patent Abstracts of Japan, Publication No. 4-153742, published May 27, 1992.

* cited by examiner

| ID | HW Acc ID | HEADER POINTER | PHYSICAL ADDRESS | PROGRAM COUNTER VALUE |
|----|-----------|----------------|------------------|----------------------|
| 41 | 42 | 43 | 44 | 45 |

FIG.5

| EVENT | ID | HW Acc ID | HEADER POINTER | PHYSICAL ADDRESS | PROGRAM COUNTER VALUE |
|---|---|---|---|---|---|
| RECEIVE PREPROCESSING UNIT PACKET | ● | — | ● | — | — |
| RECEIVE CPU CORE PACKET | ● | — | ● | — | ● |
| ACCESS HW ACCELERATOR | ● | ● | ● | — | ● |
| ACCESS MEMORY READ | ● | — | ● | ● | ● |
| RECEIVE OUTPUT UNIT PACKET | ● | — | ● | — | — |
| DETECT CALL/RETURN INSTRUCTION | ● | | ● | | ● |

| ID | HW Acc ID | S/E | HEADER POINTER | PHYSICAL ADDRESS | PROGRAM COUNTER VALUE |
|---|---|---|---|---|---|
| 41 | 42 | 46 | 43 | 44 | 45 |

FIG.9

INFORMATION PROCESSING APPARATUS AND METHOD OF COLLECTING PERFORMANCE ANALYSIS DATA

CROSS-REFERENCE TO RELATED APPLICATION

This application is a U.S. continuation application filed under 35 USC 111(a) claiming benefit under 35 USC 120 and 365(c) of PCT Application PCT/JP2012/075415 filed on Oct. 1, 2012, the entire contents of which are incorporated herein by reference.

FIELD

The embodiments discussed herein are related to an information processing apparatus and a method of collecting performance analysis data.

BACKGROUND

In a network, a processor exclusively used for packet processing (packet processor) is used as an information processing apparatus for performing high-speed packet processing. The processor exclusively used for packet processing includes instructions exclusively used for increasing the efficiency of packet processing, a hardware accelerator, etc., and executes processes such as rewriting the packet header.

In recent years, for the purpose of reducing cost, a packet processor has been used, in which a plurality of general-purpose processor cores are installed. Because general-purpose processor cores are used, it is possible to use an operating system service such as Linux, and it is possible to develop software by a high-level language such as the C language. Furthermore, when the development environment is Linux, it is possible to perform performance analysis and debugging by using open software such as OProfile and GDB, and the design efficiency may be significantly enhanced.

However, when a sampling type profiler such as OProfile is used as a performance analysis tool, it is difficult to perform performance analysis with high precision. By the sampling type profiler, the operating system interrupts a program at regular intervals to check the program counter, and records the value of the checked program counter. After the program ends, the time taken to execute the entire program, and the time taken to execute each subroutine (function) called in the program, are checked based on the recorded values of the program counter. Accordingly, it is possible to analyze the time taken for each subroutine. In such a sampling type profiler, the shorter the interval of sampling the program counter, the higher the precision in measuring the data for performance analysis. However, when using the interrupt by the operating system, the sampling intervals are significantly larger than the CPU cycle, and therefore it is difficult to increase the precision. Although there is such a program, in the case of a sampling type profiler, there is no need to change the program, and the target program may be executed at substantially the same speed, at the time of regular operations and at the time of performance analysis.

Furthermore, in the case of a sampling type profiler, the sampling intervals are asynchronous with respect to an activation event of the program (packet arrival event, etc.), and the designer is unable to sample only the target portion that he or she wants to know. For example, when the designer wants to analyze the performance of packet processing, the sampling intervals are asynchronous with respect to the packet arrival intervals, and therefore the data that is unrelated to the target process, such as data relevant to a polling process before the packet arrives, is also needlessly included in the performance analysis data. Furthermore, in the case of a sampling type profiler, it is difficult to know the processing time of hardware other than the processor cores, i.e., the time taken for memory access and the processing time of an exclusively-used hardware accelerator.

Therefore, in the case of analyzing the performance of packet processing, and in the case of analyzing the performance including the time of memory access and the processing time of an exclusively-used hardware accelerator, code for reading the value of a performance counter is embedded in the program. However, this method has a problem in that there is a need to recompile the program by embedding the code for collecting performance analysis data in the original source code. Furthermore, there is a problem in that the program that is the target of performance evaluation, operates in a different manner from that of the original program, due to the embedded code. When the above code is inserted in a program, and the counter is accessed many times while the program is being executed, overhead of a total of approximately several hundred cycles occurs, and an accurate performance analysis is not possible.

Patent Document 1: Japanese National Publication of International Patent Application No. 2004-519769
Patent Document 2: Japanese Laid-Open Patent Publication No. H10-260869

SUMMARY

According to an aspect of the embodiments, an information processing apparatus includes a packet preprocessing unit configured to generate a packet process request when a packet is received; a CPU core configured to process the packet in response to the packet process request; a hardware element configured to generate a message including information identifying a predetermined event, in response to the predetermined event occurring in accordance with the processing of the packet, the hardware element being provided in the CPU core; and a message recording unit configured to record the message generated by the hardware element together with a count value of a timer.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Preferred embodiments of the present invention will be explained with reference to accompanying drawings. Note that in the drawings, the same elements or corresponding elements are denoted by the same reference numerals, and redundant descriptions are appropriately omitted.

Figure 1:
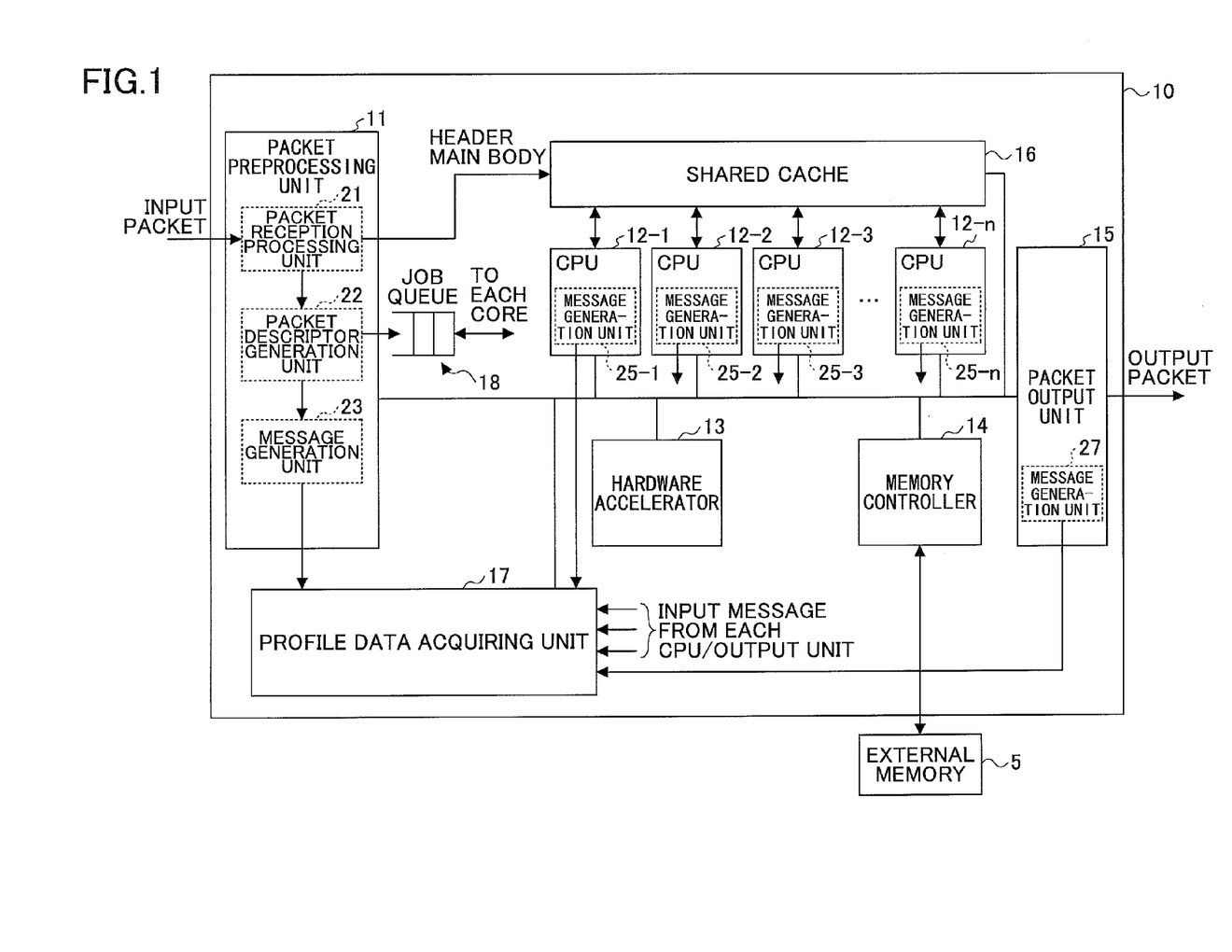
FIG. 1 illustrates an example of a configuration of a processor exclusively used for packet processing (packet processor), as an information processing apparatus.

FIG. 1 illustrates an example of a configuration of a processor exclusively used for packet processing (packet processor), as an information processing apparatus. A processor exclusively used for packet processing (hereinafter, "packet processor") 10 of FIG. 1 includes a packet preprocessing unit 11, CPU cores 12-1 through 12-n, a hardware accelerator 13, a memory controller 14, a packet output unit 15, a shared cache 16, and a profile data acquiring unit 17. The packet processor 10 further includes a job queue 18. The packet preprocessing unit 11 includes a packet reception processing unit 21, a packet descriptor generation unit 22, and a message generation unit 23. The CPU cores 12-1 through 12-n include message generation units 25-1 through 25-n, respectively. The packet output unit 15 includes a message generation unit 27. The packet processor 10 is connected to an external memory 5.

When an input packet is received, the packet preprocessing unit 11 generates a packet processing request with respect to the CPU cores 12-1 through 12-n. Specifically, first, when an input packet is received, the packet reception processing unit 21 of the packet preprocessing unit 11 executes, with respect to the input packet, a MAC layer termination process, a cutout process of the packet header, a flow sorting (load distributing) process, etc. The packet header that has been cut out from the input packet may be stored in the shared cache 16 that is common to the cores. Furthermore, the payload of the input packet may be stored in the external memory 5 via the memory controller 14. After the reception process is performed by the packet reception processing unit 21, the packet descriptor generation unit 22 of the packet preprocessing unit 11 generates a packet descriptor, which includes information for increasing the efficiency of the process at the CPU cores 12-1 through 12-n, and pointer information indicating the storage position of the packet header. The packet descriptor generation unit 22 stores the packet descriptor in the job queue 18 provided in each core, to make a packet process request to the CPU cores 12-1 through 12-n.

The message generation unit 23 of the packet preprocessing unit 11 generates, for each packet, a message including an ID identifying the packet preprocessing unit 11 and pointer information indicating the storage position of the packet header, and supplies the generated message to the profile data acquiring unit 17. As described below, the profile data acquiring unit 17 records the received message in an embedded memory, together with a count value of the timer. Accordingly, the time at which a certain input packet arrives at the packet processor 10, is known.

Each of the CPU cores 12-1 through 12-n processes a packet in response to a packet process request. Specifically, each of the CPU cores 12-1 through 12-n monitors the job queue 18 assigned to the core itself, and starts a packet process when there is data in the queue. According to this packet process, the CPU cores 12-1 through 12-n perform processes of rewriting the IP address that is the next destination to which the packet is to be sent, decrementing the TTL (Time To Live) value indicating the survival time of the IP packet by one every time a router is passed, etc.

The CPU cores 12-1 through 12-n respectively include the message generation units 25-1 through 25-n, which are electronic circuits that are hardware elements. The message generation units 25-1 through 25-n generate a message including information identifying a predetermined event, in response to the predetermined event that occurs in accordance with a packet process in the corresponding CPU cores 12-1 through 12-n. This message may further include an ID identifying the corresponding CPU core, and pointer information indicating the storage position of the packet header. Furthermore, the information identifying a predetermined event included in this message, may be data indicating the value of the program counter of the CPU core. That is to say, data that identifies which instruction has been executed, may be included in the message.

The predetermined event described above may include execution of a call instruction for a subroutine by the CPU core, and execution of a return instruction from the subroutine by the CPU core. That is to say, for example, when the CPU core 12-1 calls a subroutine, the message generation unit 25-1 of the CPU core 12-1 may generate a message including the ID, etc., of the CPU core 12-1. Furthermore, the predetermined event described above may include an event of starting a packet process in response to a packet process request made in the CPU core. A message generated by any of the above events is supplied to the profile data acquiring unit 17. As described below, the profile data acquiring unit 17 records the received message in an embedded memory, together with the count value of the timer.

The hardware accelerator 13 is an exclusively-used hardware element for executing part of the above packet process at high speed, instead of the above-described CPU core; the hardware accelerator 13 starts a process in response to an access from the above-described CPU core. That is to say, the hardware accelerator 13 executes a process in response to a process execution request from the CPU core. Note that the predetermined event that triggers the generation of a message by the message generation units 25-1 through 25-n of the CPU cores 12-1 through 12-n, also includes an access from the CPU core to an exclusively-used hardware element such as the hardware accelerator 13. That is to say, for example, when the CPU core 12-1 accesses the hardware accelerator 13 (i.e., when a process execution request is made), the message generation unit 25-1 of the CPU core 12-1 generates a message including information identifying the predetermined event. This message may further include an ID identifying the corresponding CPU core, an ID identifying each exclusively-used hardware element such as the hardware accelerator 13, and pointer information indicating the storage position of the packet header. Furthermore, the information identifying the predetermined event included in this message may be data indicating the value of the program counter of the CPU core.

Note that for accessing a hardware accelerator from inside the program, an API (Application Program Interface) unique to the manufacturer is usually provided. In the CPU cores 12-1 through 12-n, the corresponding message generation units 25-1 through 25-n may generate a message at both the starting time point of the process of the API, and the ending time point of waiting for the process of the hardware accelerator.

The memory controller 14 manages the access to the external memory 5. When a read access occurs from the CPU cores 12-1 through 12-n to the memory controller 14, the corresponding message generation units 25-1 through 25-n may generate a message. Furthermore, also when read data is returned from the memory controller 14 to the CPU cores 12-1 through 12-n, the corresponding message generation units 25-1 through 25-n may generate a message. This message may include information identifying the predetermined event (memory read access or returning read data), an ID identifying the corresponding CPU core, and pointer information indicating the storage position of the packet header. Furthermore, the information identifying the predetermined event included in this message may be data indicating the value of the program counter of the CPU core. Furthermore, this message may include the physical address of the memory that is the access target.

When the packet process by the CPU cores 12-1 through 12-n is ended, the packet output unit 15 forms a packet by combining the packet header from the shared cache 16 and the payload from the external memory 5. The packet is output outside the packet processor 10 by the packet output unit 15. When outputting the packet, the message generation unit 27 generates a message storing an ID identifying the message generation unit 27 and a packet header pointer, and sends the message to the profile data acquiring unit 17. The profile data acquiring unit 17 records the received message in an embedded memory together with the counter value of the timer. It is possible to extract, from the data recorded by the profile data acquiring unit 17, only the log relevant to a particular packet process, by using a packet header pointer value as a key. Based on the extracted log, it is possible to obtain the processing time (number of processing cycles) from the input to the output of a certain packet.

Figure 2:
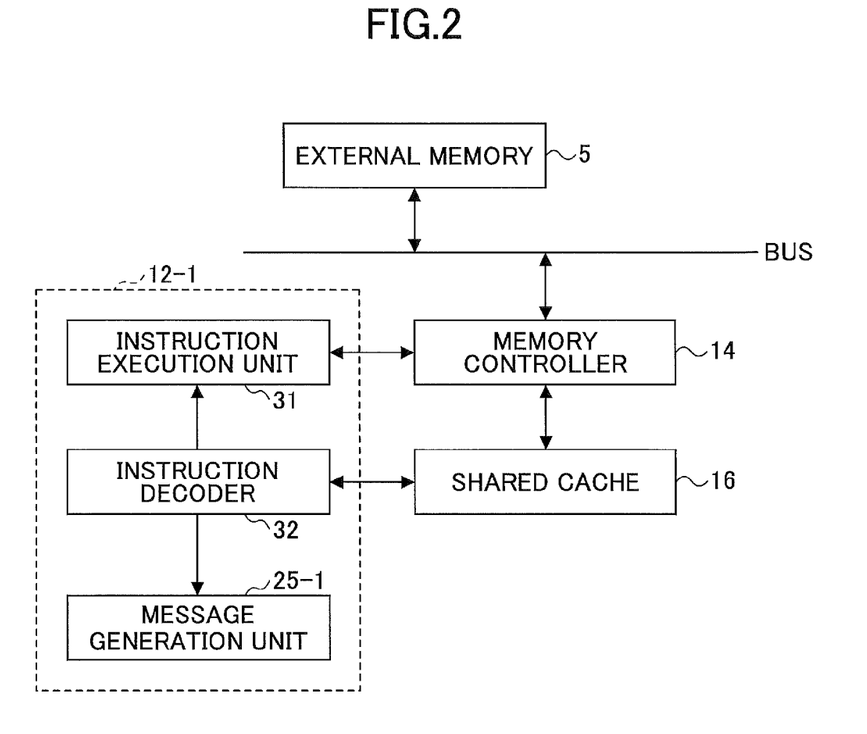
FIG. 2 illustrates an example of a configuration of a CPU core.

FIG. 2 illustrates an example of a configuration of the CPU core 12-1. The other CPU cores 12-2 through 12-n may also have the same configuration as the CPU core 12-1. The CPU core 12-1 of FIG. 2 includes an instruction execution unit 31, an instruction decoder 32, and the message generation unit 25-1. The instruction decoder 32 decodes an instruction of a program that has been fetched from an address indicated by the program counter, and supplies a control signal indicating the decode result to the instruction execution unit 31. The instruction execution unit 31 executes the instruction of the above program, based on the control signal indicating the decode result by the instruction decoder 32 The message generation unit 25-1 is an exclusively-used circuit for generating messages, provided separately from the instruction execution unit 31 for executing instructions. That is to say, the message generation unit 25-1 is not a circuit for executing regular instructions, such as an operation expression or a control statement in a program, or a circuit for executing an instruction for reading a value of a performance counter inserted in a program. The message generation unit 25-1 is a hardware element for generating a message in response to the occurrence of a predetermined event as described in the above examples (execution of a call instruction for a subroutine and execution of a return instruction from a subroutine). For example, when the instruction decoder 32 decodes a call instruction for a subroutine or a return instruction from a subroutine, the instruction decoder 32 may send a report to the message generation unit 25-1 that a predetermined event has occurred. In response to the occurrence of the predetermined event, the message generation unit 25-1 generates a message.

Alternatively, for example, a process request register may be provided inside the CPU cores 12-1 through 12-n, and a predetermined value may be set in the process request register in response to the occurrence of the predetermined event. The message generation unit 25-1 may generate a message by being triggered by a state change of a value of the process request register to the above-described predetermined value. A predetermined value may be set in the process request register, when one of a plurality of predetermined instructions identified in advance is decoded. Alternatively, a register set instruction to set a predetermined value in the process request register may be explicitly inserted in the packet process program, or may be automatically inserted by a compiler.

Figure 3:
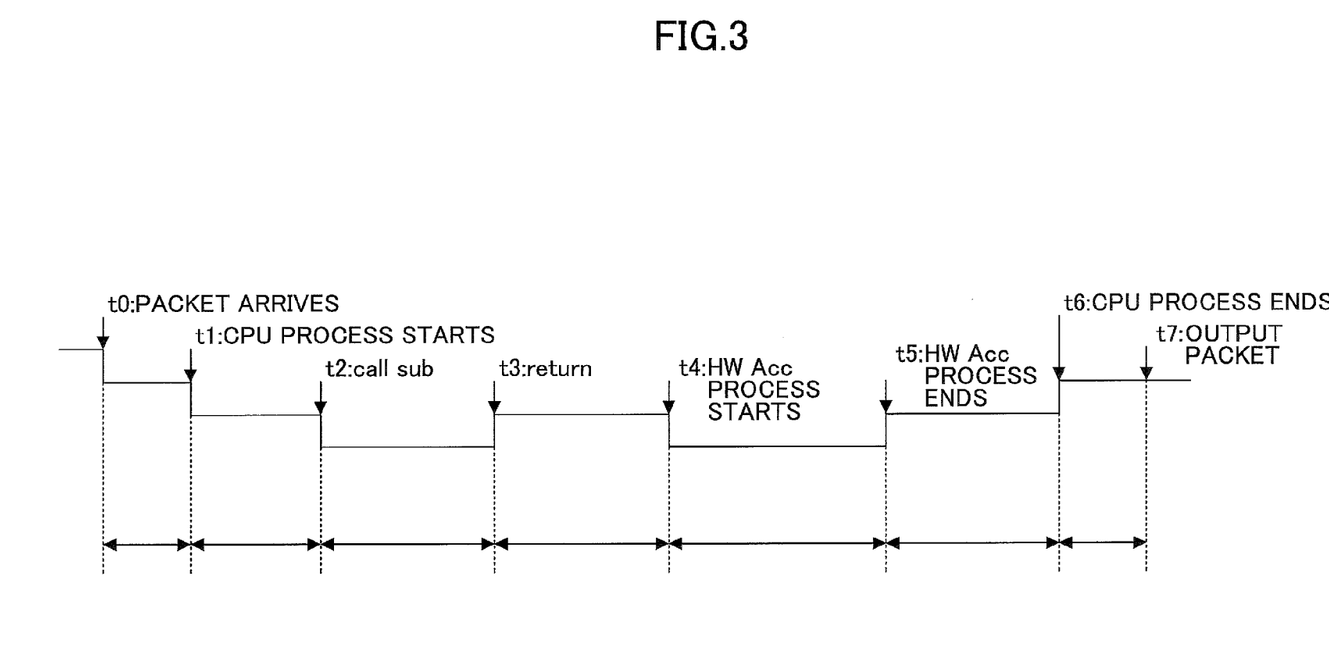
FIG. 3 illustrates data that may be acquired by the packet processor illustrated in FIG. 1.

FIG. 3 illustrates data that may be acquired by the packet processor 10 illustrated in FIG. 1. In the example of FIG. 3, at a time t0, when a packet arrives at the packet preprocessing unit 11, a message is recorded in the profile data acquiring unit 17 together with a counter value corresponding to the time t0. At time t1, when a process of the CPU core corresponding to the packet starts, a message is recorded in the profile data acquiring unit 17 together with a counter value corresponding to the time t1. At time t2, when the CPU core calls a subroutine while the packet is being processed, a message is recorded in the profile data acquiring unit 17 together with a counter value corresponding to the time t2. At time t3, when the CPU core executes a return instruction from the subroutine while the packet is being processed, a message is recorded in the profile data acquiring unit 17 together with a counter value corresponding to the time t3. At time t4, when the CPU core calls the hardware accelerator 13 while the packet is being processed, a message is recorded in the profile data acquiring unit 17 together with a counter value corresponding to the time t4. At time t5, when the CPU core receives a message indicating that the process of the hardware accelerator 13 has ended while the packet is being processed, a message is recorded in the profile data acquiring unit 17 together with a counter value corresponding to the time t5. At time t6, when the process of the CPU core corresponding to the packet ends, a message is recorded in the profile data acquiring unit 17 together with a counter value corresponding to the time t6. At time t7, when the packet is output from the packet output unit 15, a message is recorded in the profile data acquiring unit 17 together with a counter value corresponding to the time t7. As described above, the data recorded by the profile data acquiring unit 17 includes counter values corresponding to the times when the events have occurred (i.e., the counter values indicating the times). Therefore, by checking the recorded data (performance analysis data), it is possible to obtain the time taken for the entire processing of the packet, the time taken for the subroutine process, and the time taken for a process at the hardware accelerator.

As described above, in the packet processor 10, the hardware elements embedded in the respective functional blocks (the packet preprocessing unit 11, the CPU cores 12-1 through 12-n, and the packet output unit 15) autonomously send messages. Therefore, it is possible to measure the number of process cycles with high precision, while maintaining substantially zero overhead associated with the acquisition of performance analysis data, without affecting the application software. Furthermore, as for the part that is unrelated to the packet process, such as a packet process standby loop, the performance analysis data is not acquired, and therefore it is possible to reduce the man-hour relevant to analyzing the performance analysis data and acquiring the performance analysis data by the user. Furthermore, by providing a function of switching whether to generate a message for each functional block, it is possible to acquire only the performance analysis data of the selected block. Furthermore, when the performance analysis data is not acquired, by stopping the clock in the target circuit by clock gating, or by stopping the power source by power gating, it is possible to reduce the needless consumption of power.

Figure 4:
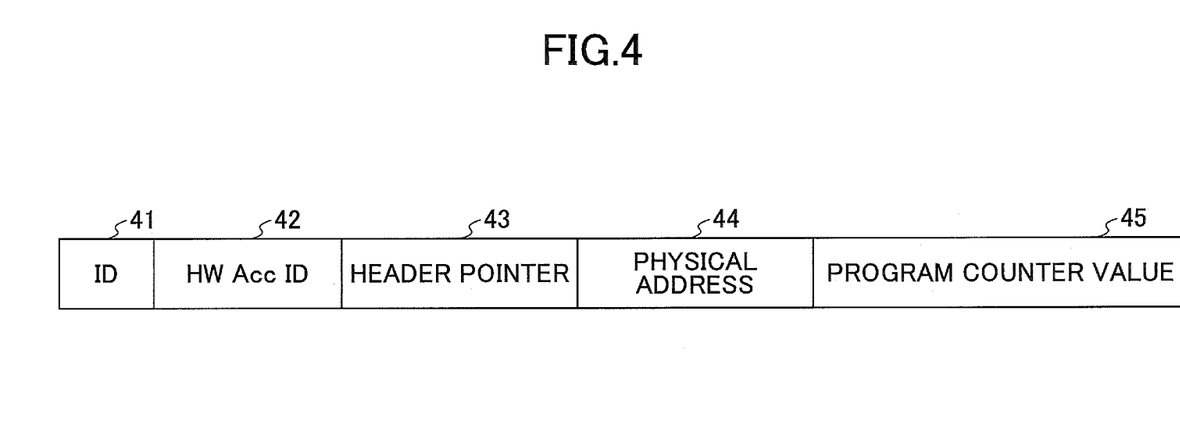
FIG. 4 illustrates an example of a configuration of a message that is generated by a message generation unit.

FIG. 4 illustrates an example of a configuration of a message that is generated by the message generation unit. The message illustrated in FIG. 4 includes an ID 41, a hardware accelerator ID 42, a header pointer 43, a physical address 44, and a program counter value 45. The ID 41 is an identifier for identifying the functional block (the packet preprocessing unit 11, the CPU cores 12-1 through 12-n, and the packet output unit 15) that has generated the message. The hardware accelerator ID 42 is an identifier for identifying an exclusively-used hardware element for executing a processor process at high speed, instead of the CPU cores 12-1 through 12-n. The header pointer 43 is pointer information indicating the storage position of the packet header. The physical address 44 is the physical address of the memory access destination according to a data reading instruction, etc. The program counter value 45 is data indicating the value of the program counter of the CPU core that has generated the message, and indicates the value of the program counter when an event triggering message generation has occurred.

Figure 5:
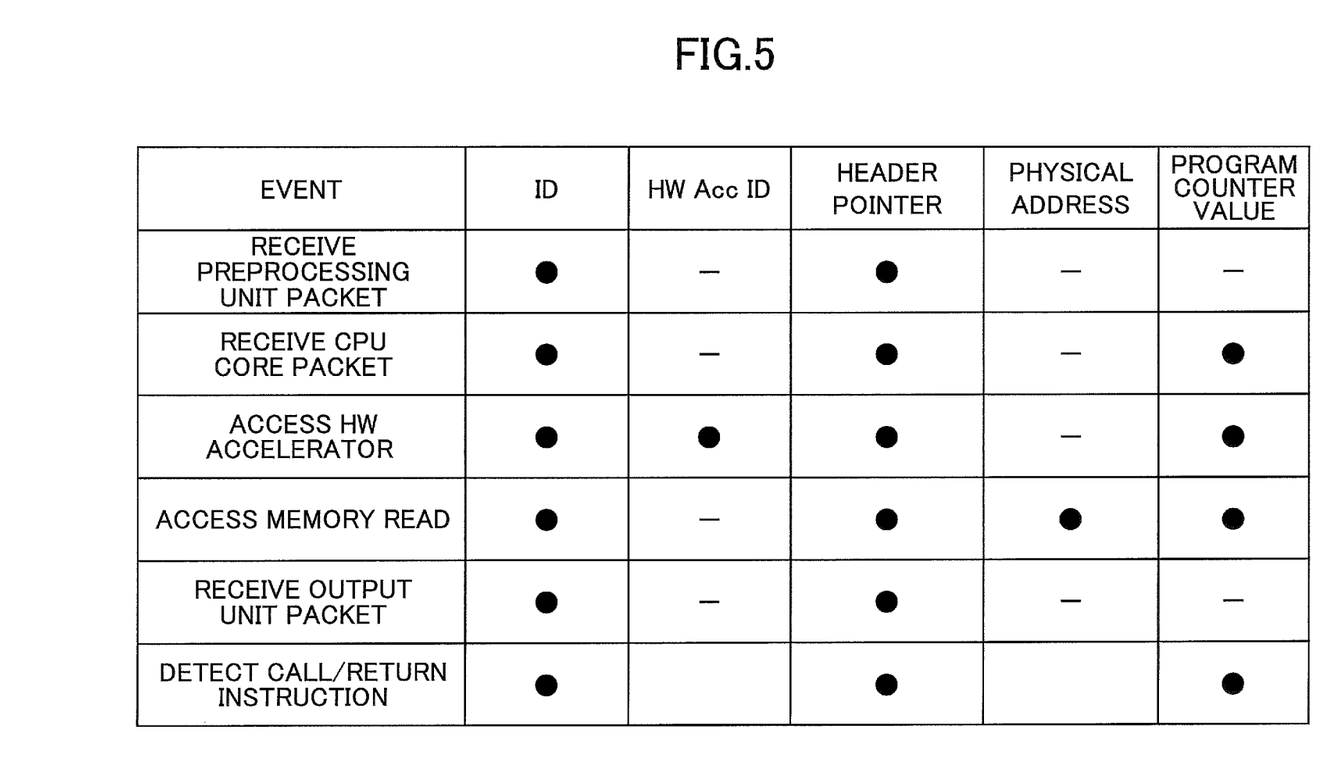
FIG. 5 illustrates the contents of different messages that are generated in response to the occurrence of different events.

FIG. 5 illustrates the contents of different messages that are generated in response to the occurrence of different events. As illustrated in FIG. 5, the message, which is generated when the packet preprocessing unit 11 receives a packet, includes the ID 41 and the header pointer 43. The message, which is generated when the CPU cores 12-1 through 12-n receive a packet (when starting a packet process), includes the ID 41, the header pointer 43, and the program counter value 45. The message, which is generated when the CPU cores 12-1 through 12-n access the hardware accelerator 13, includes the ID 41, the hardware accelerator ID 42, the header pointer 43, and the program counter value 45. The message, which is generated when the packet output unit 15 outputs a packet, includes the ID 41 and the header pointer 43. Furthermore, the message, which is generated when the CPU cores 12-1 through 12-n execute a call instruction for a subroutine and a return instruction from the subroutine, includes the ID 41, the header pointer 43, and the program counter value 45.

Figure 6:
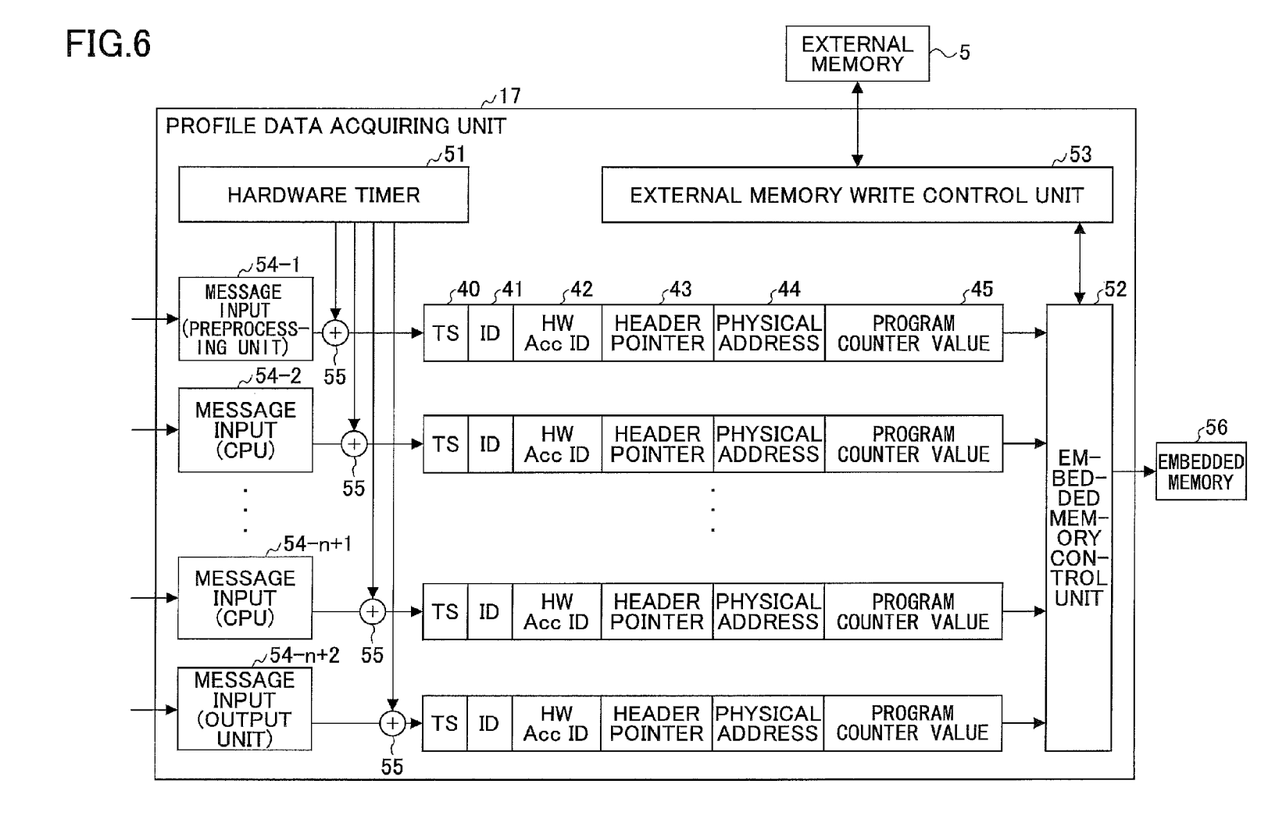
FIG. 6 illustrates an example of a configuration of a profile data acquiring unit.

FIG. 6 illustrates an example of a configuration of the profile data acquiring unit 17. The profile data acquiring unit 17 includes a hardware timer 51, an embedded memory control unit 52, an external memory write control unit 53, message input units 54-1 through 54-n+2, and a plurality of addition units 55. The profile data acquiring unit 17 is connected to the external memory 5 and an embedded memory 56. Note that the embedded memory 56 may be included in the profile data acquiring unit 17.

The hardware timer 51 performs the counting operation based on an operation clock of the packet processor 10, and outputs data indicating a count value that is used as an index of the elapsed time. The message input units 54-1 through 54-n+2 are provided in association with the packet preprocessing unit 11, the CPU cores 12-1 through 12-n, and the packet output unit 15, respectively, and receive messages supplied from the corresponding functional blocks. Accordingly, even when messages arrive from a plurality of functional blocks at the same time, it is possible to process the respective messages without any problem.

The plurality of addition units 55 are provided in association with the message input units 54-1 through 54-n+2, respectively. The addition units 55 add data indicating a count value generated by the hardware timer 51, to each of the messages output from the message input units 54-1 through 54-n+2. Accordingly, a time stamp (TS) 40, which is data indicating a count value, is added to the message having the structure as illustrated in FIG. 4. The time stamp 40 becomes information indicating the time when the message is received. The embedded memory control unit 52 stores the received message in the embedded memory 56. When a predetermined amount of data is accumulated in the embedded memory 56, the embedded memory control unit 52 reads data from the embedded memory 56, and transfers the data to the external memory 5 via the external memory write control unit 53. Accordingly, even when a large amount of performance analysis data is collected, in relation to packet processes performed for multiple packets, it is possible to record all of the data without any problem.

However, when all of the messages, which are generated for all of the events that have occurred while processing multiple packets, are stored in time series, but the memory capacity is not large enough, the collected performance analysis data may only correspond to a short time period. In the following, a description is given of a method of storing the performance analysis data in an efficiently compressed format.

Figure 7:
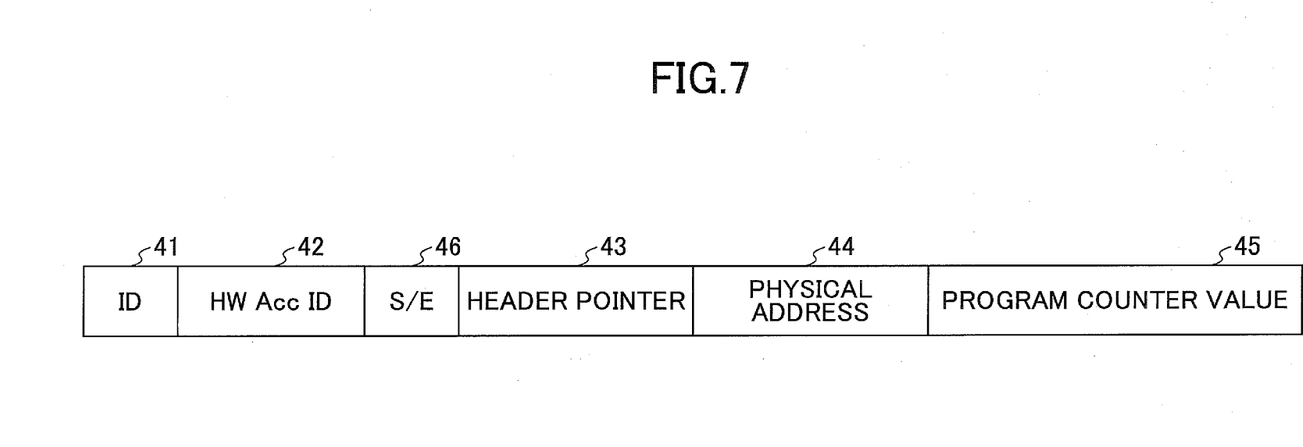
FIG. 7 illustrates an example of a configuration of a message used for storing performance analysis data in an efficiently compressed format.

FIG. 7 illustrates an example of a configuration of a message used for storing the performance analysis data in an efficiently compressed format. The message illustrated in FIG. 7 includes an S/E field 46, in addition to the message having the configuration as illustrated in FIG. 4. The S/E field 46 may be a flag of one bit, and expresses two events of start (S) and end (E).

Figure 8:
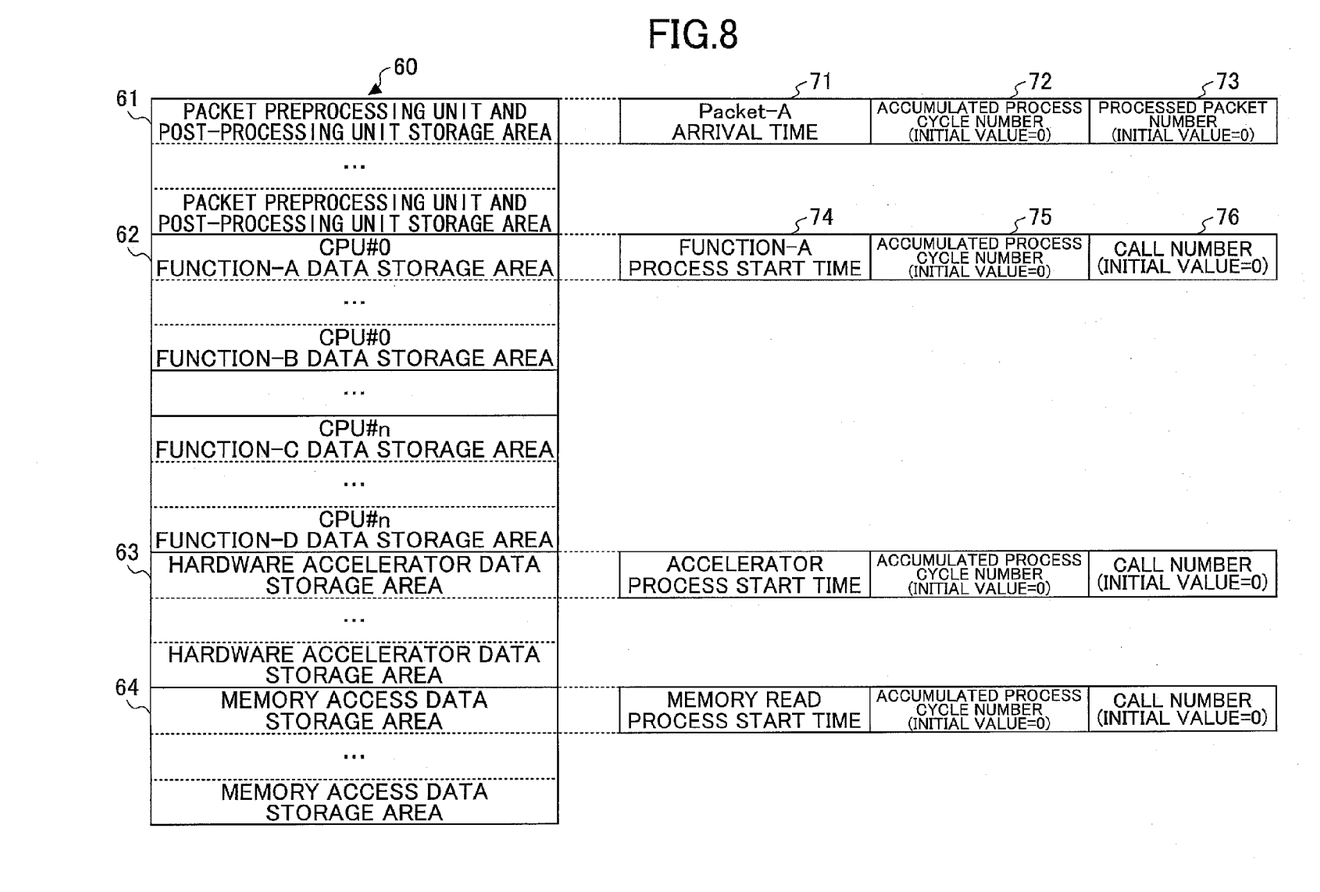
FIG. 8 illustrates a method of storing the performance analysis data in an efficiently compressed format.

FIG. 8 illustrates a method of storing the performance analysis data in an efficiently compressed format. In FIG. 8, a storage area 60 is an area in a memory for storing the performance analysis data. In the storage area 60, storage areas of the performance analysis data are provided in association with the respective functional blocks, such as a packet preprocessing unit and post-processing unit storage area 61 and a hardware accelerator data storage area 63.

First, when the packet preprocessing unit 11 receives a packet "Packet-A", the packet preprocessing unit 11 sends a message including the S/E field 46 (see FIG. 7) in which a value S indicating start is set, in addition to an ID identifying the packet preprocessing unit 11 and a packet header pointer. When the profile data acquiring unit 17 receives this message, for example, the profile data acquiring unit 17 calculates the address of a Packet-A arrival time field 71 in the packet preprocessing unit and post-processing unit storage area 61, based on the ID of the packet preprocessing unit 11 and the packet header pointer. This address may be, for example, a hash value determined by the ID of the packet preprocessing unit 11 and the packet header pointer. Alternatively, the address may be determined by entering the ID of the packet preprocessing unit 11 and the packet header pointer in an associative memory (Content Addressable Memory). The profile data acquiring unit 17 updates the value of the Packet-A arrival time field 71 with the present time (present value of timer), when the S/E field 46 is indicating a value S indicating start.

Next, for example, the CPU core 12-1 starts a packet process for the packet "Packet-A", and calls a subroutine (function-A) during this packet process. When calling the subroutine, the CPU core 12-1 sends a message including the S/E field 46 (see FIG. 7) in which a value S indicating start is set, in addition to an ID identifying the CPU core 12-1 and a program counter value. When the profile data acquiring unit 17 receives this message, for example, the profile data acquiring unit 17 calculates an address of a function-A process start time field 74 in a CPU#0 function-A data storage area 62, based on the ID identifying the CPU core 12-1 and the program counter value. This address may be, for example, a hash value determined by the ID identifying the CPU core 12-1 and the program counter value. Alternatively, the address may be determined from an associative memory. The profile data acquiring unit 17 updates the value of the function-A process start time field 74 with the present time (present value of timer), when the S/E field 46 is indicating a value S indicating start.

Subsequently, the CPU core 12-1 executes a return instruction at the time point when the subroutine (function-A) ends. When executing the return instruction, the CPU core 12-1 sends a message including the S/E field 46 in which a value E indicating end is set, in addition to the ID identifying the CPU core 12-1 and the program counter value. Note that when a return instruction from the subroutine is executed, the execution position of the program returns to the position of the next instruction of the call instruction for the subroutine. As the program counter value included in the above message, "return position−1" (i.e., the position of the call instruction) is set. When the profile data acquiring unit 17 receives this message, for example, the profile data acquiring unit 17 calculates the address of the function-A process start time field 74 in the CPU#0 function-A data storage area 62, based on the ID identifying the CPU core 12-1 and the program counter value. When the S/E field 46 is indicating a value E indicating end, the profile data acquiring unit 17 obtains the difference in the counter value, by subtracting the value of the function-A process start time field 74 (value of the timer at the time of calling the function-A) from the present time (present value of timer). The profile data acquiring unit 17 adds the difference in the counter value obtained as described above, to a value indicating the accumulated number of cycles of executing the subroutine (function-A) stored in an accumulated process cycle number field 75. Furthermore, the profile data acquiring unit 17 increments the value indicating the number of calls stored in a call number field 76, by one.

The operation of writing data into the hardware accelerator data storage area 63 is similar to the operation of writing data as described above. However, for determining the address, for example, the ID of the corresponding CPU core, the packet header pointer, and the ID of the hardware accelerator may be used. Furthermore, the operation of writing data into a memory access data storage area 64 is similar to the operation of writing data as described above. However, for determining the address, for example, the ID of the corresponding CPU core and a physical address may be used.

Lastly, when the packet output unit 15 outputs the packet "Packet-A", the packet output unit 15 sends a message including the S/E field 46 in which a value E indicating end is set, in addition to an ID identifying the packet output unit 15 and the packet header pointer. When the profile data acquiring unit 17 receives a message including the ID of the packet output unit 15, the profile data acquiring unit 17 does not use the ID of the packet output unit 15, but uses the ID of the packet preprocessing unit 11 and the packet header pointer for calculating the address. Accordingly, it is possible to calculate the address of the Packet-A arrival time field 71 in the packet preprocessing unit and post-processing unit storage area 61. When the S/E field 46 is indicating a value E indicating end, the profile data acquiring unit 17 obtains the difference in the counter value, by subtracting the value of the Packet-A arrival time field 71 (value of timer when Packet-A has arrived) from the present time (present value of timer). The profile data acquiring unit 17 adds the difference in the counter value obtained as described above to the value (initial value 0) stored in an accumulated process cycle number field 72. Furthermore, the profile data acquiring unit 17 increments the value indicating the number of processed packets stored in a processed packet number field 73, by one.

As described above, the message includes the S/E field 46 indicating either one of a first value S or a second value E. When the S/E field 46 is indicating the first value S, the profile data acquiring unit 17 records a first count value, which is the present count value of the timer. Furthermore, when the S/E field 46 is indicating the second value E, the profile data acquiring unit 17 records the difference between the recorded first count value and a second count value that is the present count value of the timer. Accordingly, it is possible to store the performance analysis data in an efficiently compressed format.

Figure 9:
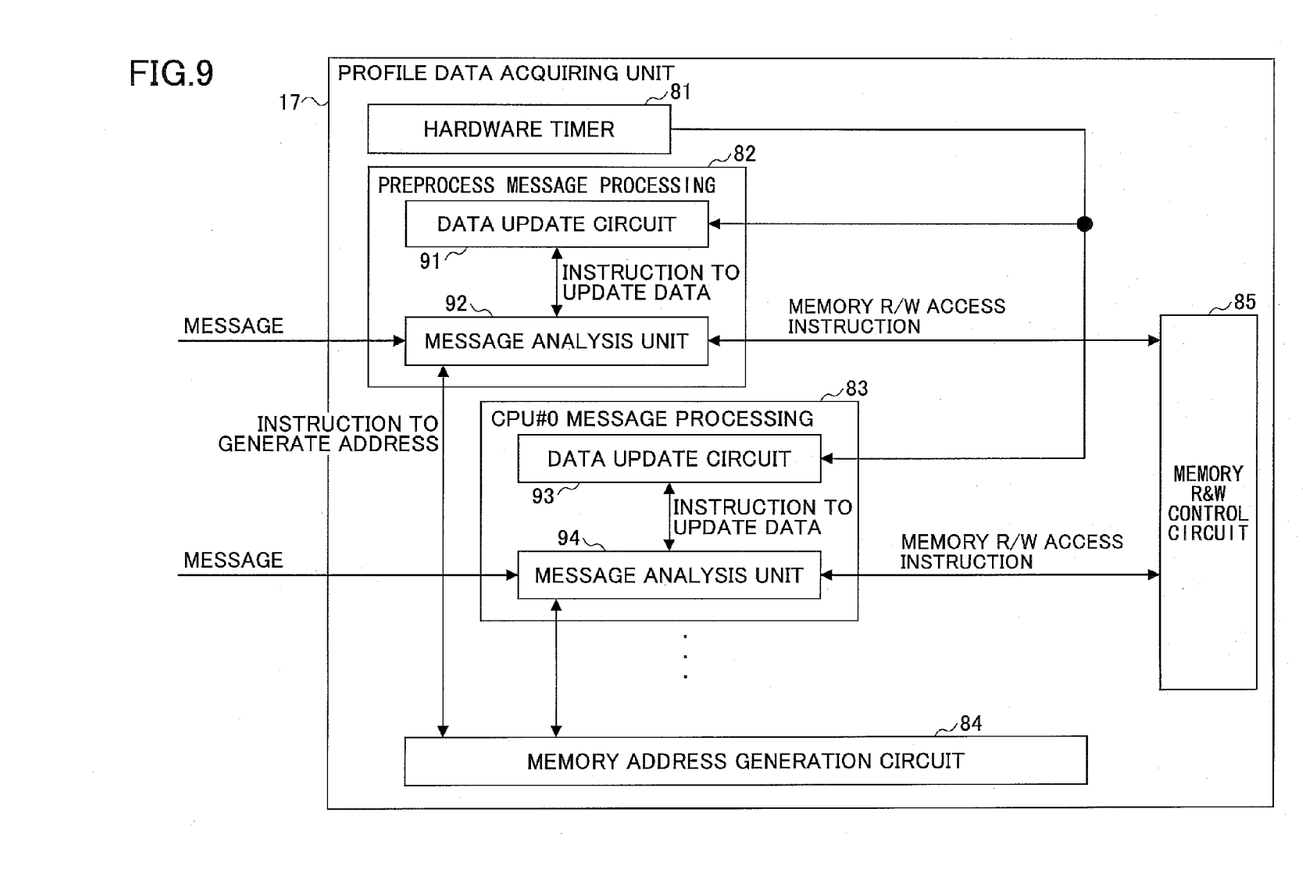
FIG. 9 illustrates an example of a configuration of the profile data acquiring unit, in the case of storing the performance analysis data in an efficiently compressed format.

FIG. 9 illustrates an example of a configuration of the profile data acquiring unit 17, in the case of storing the performance analysis data in an efficiently compressed format. The profile data acquiring unit 17 of FIG. 9 includes a hardware timer 81, a preprocess message processing unit 82, a CPU#0 message processing unit 83, a memory address generation circuit 84, and a memory R&W control circuit 85. For each CPU core, a message processing unit similar to the CPU#0 message processing unit 83 may be provided. Furthermore, for the packet output unit 15, a message processing unit similar to the preprocess message processing unit 82 may be provided.

The preprocess message processing unit 82 includes a data update circuit 91 and a message analysis unit 92. The CPU#0 message processing unit 83 includes a data update circuit 93 and a message analysis unit 94. The operation of the preprocess message processing unit 82 and the operation of the CPU#0 message processing unit 83 are basically the same, and therefore in the following, the operation of the CPU#0 message processing unit 83 is described as an example.

When the CPU#0 (for example, the CPU core 12-1) calls a subroutine, the CPU#0 sends a message including the S/E field 46 in which a value S indicating start is set, in addition to an ID identifying the CPU#0 and a program counter value. When the message analysis unit 94 of the CPU#0 message processing unit 83 receives the message, the message analysis unit 94 supplies the ID identifying the CPU#0 and the program counter value to the memory address generation circuit 84. The memory address generation circuit 84 calculates the address of the process start time field based on the ID identifying the CPU#0 and the program counter value. This address may be, for example, a hash value determined by the ID identifying the CPU#0 and the program counter value. When the S/E field 46 is indicating a value S indicating start, the message analysis unit 94 receives the present count value of the hardware timer 81 from the data update circuit 93, and writes the count value in the process start time field via the memory R&W control circuit 85.

Then, when executing the return instruction of the subroutine, the CPU#0 sends a message including the S/E field 46 in which a value E indicating end is set, in addition to the ID identifying the CPU#0 and the program counter value. When the message analysis unit 94 of the CPU#0 message processing unit 83 receives this message, the message analysis unit 94 supplies the ID identifying the CPU#0 and the program counter value to the memory address generation circuit 84. The memory address generation circuit 84 calculates the address of the process start time field based on the ID identifying the CPU#0 and the program counter value. When the S/E field 46 is indicating a value E indicating end, the message analysis unit 94 reads, from the address, the value of the process start time field, the value of the accumulated process cycle number field, and the value of the call number field, via the memory R&W control circuit 85. The message analysis unit 94 supplies the read values to the data update circuit 93. The data update circuit 93 obtains the difference in the counter value, by subtracting the value of the process start time field (count value of timer at the time of calling) from the present count value of the hardware timer 81, and adds the difference in the counter value to the value of the accumulated process cycle number field. Accordingly, the value of the accumulated process cycle number field is updated. Furthermore, the data update circuit 93 increments the value of the call number field (value indicating the number of calls) by one. Accordingly, the value of the call number field is updated. The message analysis unit 94 writes the updated value of the accumulated process cycle number field in the accumulated process cycle number field via the memory R&W control circuit 85, and writes the updated value of the call number field in the call number field.

Note that in FIGS. 1, 2, 6, and 9 used in the above description, the boundaries between the functional blocks indicated by boxes basically indicate functional boundaries, and the boundaries are not limited to separating the physical positions, separating the electrical signals, or separating the control logic. Each of the functional blocks that are hardware elements implemented by electronic circuits may be a single hardware module that is somewhat physically separated from other blocks, or may be a single function in a hardware module in which the block is physically integrated with other blocks.

The present invention is not limited to the specific embodiments described herein, and variations and modifications may be made without departing from the scope of the present invention.

According to an aspect of the embodiments, an information processing apparatus is provided, which is capable of acquiring data for performance analysis of a packet process, without changing a program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a packet preprocessing unit configured to generate, when a packet is received, a packet process request and a message including pointer information that indicates a storage position of a packet header for each packet;
   a CPU core configured to process the packet in response to the packet process request;
   a packet output unit configured to generate, when outputting the packet, a message including pointer information that indicates a storage position of the packet header;
   a hardware element, provided in the CPU core, and configured to generate a message including information identifying a predetermined event, in response to the predetermined event occurring in accordance with the processing of the packet; and
   a message recording unit configured to record the message generated by the packet preprocessing unit, the message generated by the packet output unit, and the message generated by the hardware element together with a count value of a timer.

2. The information processing apparatus according to claim 1, wherein the predetermined event includes execution of a call instruction for a subroutine by the CPU core, and execution of a return instruction from the subroutine by the CPU core.

3. The information processing apparatus according to claim 1, further comprising:
   an exclusive hardware element, accessed from the CPU core, and configured to execute a part of the processing of the packet in place of the CPU core,
   wherein the predetermined event includes an access to the exclusive hardware element by the CPU core.

4. The information processing apparatus according to claim 1, wherein the message generated by the hardware element includes data indicating a value of a program counter of the CPU core.

5. The information processing apparatus according to claim 1, wherein
   the message generated by one of the packet preprocessing unit, the packet output unit, and the hardware element includes a field indicating either one of a first value or a second value,
   the message recording unit records a first count value that is a present count value of the timer when the field in the message generated by the one of the packet preprocessing unit, the packet output unit, and the hardware element indicates the first value, and
   the message recording unit records a difference between the first count value that is recorded and a second count value that is a present count value of the timer when the field in the message generated by the one of the packet preprocessing unit, the packet output unit, and the hardware element indicates the second value.

6. The information processing apparatus according to claim 1, wherein the CPU core includes
   an instruction decoder configured to decode an instruction of a program, and
   an instruction execution unit configured to execute the instruction based on a decoded result obtained by the instruction decoder,
   wherein the hardware element is an exclusive circuit that is configured to generate the message, generated by the hardware element and is provided separately from the instruction execution unit.

7. A method of collecting performance analysis data, the method comprising:
   generating, by a packet preprocessing unit, when a packet is received, a packet process request and a message including pointer information that indicates a storage position of a packet header for each packet;

processing, by a CPU core, the packet in response to the packet process request;

generating, by a packet output unit, when outputting the packet, a message including pointer information that indicates a storage position of the packet header;

generating, by a hardware element provided in the CPU core, a message including information identifying a predetermined event, in response to the predetermined event occurring in accordance with the processing of the packet; and recording, by a message recording unit, the message generated by the packet preprocessing unit, the message generated by the packet output unit, and the message generated by the hardware element together with a count value of a timer.

8. The method according to claim 7, wherein the predetermined event includes execution of a call instruction for an subroutine by the CPU core, and execution of a return instruction from the subroutine by the CPU core.

9. The method according to claim 7, further comprising:

accessing, by the CPU core, an exclusive hardware element configured to execute a part of the processing of the packet in place of the CPU core, wherein the predetermined event includes the accessing to the exclusive hardware element by the CPU core.

10. The method according to claim 7, wherein the generating by the hardware element includes, in the message generated by the hardware element, data indicating a value of a program counter of the CPU core.

11. The method according to claim 7, wherein the message generated by one of the generating by the packet preprocessing unit, the generating by the packet output unit, and the generating by the hardware element includes a field indicating either one of a first value or a second value, the recording by the message recording unit includes recording a first count value that is a present count value of the timer when the field in the message generated by the one of the generating by the packet preprocessing unit, the generating by the packet output unit, and the generating by the hardware element indicates the first value, and the recording by the message recording unit includes recording a difference between the first count value that is recorded and a second count value that is a present count value of the timer when the field in the message generated by the one of the generating by the packet preprocessing unit, the generating by the packet output unit, and the generating by the hardware element indicates the second value.

12. The method according to claim 7, wherein the processing by the CPU core includes decoding, by an instruction decoder, an instruction of a program, and executing, by an instruction execution unit, the instruction based on a decoded result obtained by the decoding, wherein the generating by the hardware element uses an exclusive circuit that is provided separately from the instruction execution unit to generate the message generated by the hardware element.

13. The method according to claim 7, wherein the generating by the packet preprocessing unit includes, in the packet process request, the pointer information that indicates the storage position of the packet header for each packet, and the generating by the hardware element includes, in the message generated by the hardware element, the pointer information included in the packet process request.

14. The information processing apparatus according to claim 1, wherein the packet preprocessing unit includes, in the packet process request, the pointer information that indicates the storage position of the packet header for each packet, and the hardware element includes, in the message generated by the hardware element, the pointer information included in the packet process request.

* * * * *